United States Patent
Su et al.

(10) Patent No.: US 12,331,246 B2
(45) Date of Patent: Jun. 17, 2025

(54) POLYACRYLAMIDE-BASED SYMMETRIC BRANCHED POLYMER SURFACTANT AND A PROCESS FOR PREPARING THE SAME AND USE THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Zhiqing Su, Shanghai (CN); Yingcheng Li, Shanghai (CN); Yanmin Xia, Shanghai (CN); Hui Sun, Shanghai (CN); Hui Xu, Shanghai (CN); Yixing Zhu, Shanghai (CN); Lan Wang, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 28 days.

(21) Appl. No.: 18/250,508

(22) PCT Filed: Oct. 26, 2021

(86) PCT No.: PCT/CN2021/126342
§ 371 (c)(1),
(2) Date: Apr. 25, 2023

(87) PCT Pub. No.: WO2022/089410
PCT Pub. Date: May 5, 2022

(65) Prior Publication Data
US 2023/0392069 A1  Dec. 7, 2023

(30) Foreign Application Priority Data

Oct. 26, 2020 (CN) .......................... 202011156796.1

(51) Int. Cl.
*C09K 8/588* (2006.01)
*C08F 220/34* (2006.01)

(52) U.S. Cl.
CPC ............ *C09K 8/588* (2013.01); *C08F 220/34* (2013.01); *C09K 2208/06* (2013.01)

(58) Field of Classification Search
None
See application file for complete search history.

(56) References Cited

U.S. PATENT DOCUMENTS 3,984,333 A   10/1976   Van De Kraats et al.
4,222,881 A   9/1980    Byham et al.
(Continued)

FOREIGN PATENT DOCUMENTS

CN   101982224 A   3/2011
CN   102504238 A   6/2012
(Continued)

OTHER PUBLICATIONS

Koukiotis, C et al.; "Synthesis and characterization of latexes based on copolymers BA\MMA\DAAM and BA\MMA\VEOVA-10\DAAM and the corresponding 1K crosslinkable binder using the adipic acid dihydrazide as crosslinking agent"; Process in Organic Coatings; Dec. 1, 2010, vol. 69, No. 4, pp. 504-509.
(Continued)

*Primary Examiner* — John J Figueroa
(74) *Attorney, Agent, or Firm* — NKL Law; Allen Xue (57) ABSTRACT

A polyacrylamide-based symmetric branched polymer surfactant and a process for preparing the same and use thereof
(Continued)

are provided. The surfactant has an acrylamide structure unit, an anionic monomer structure unit, an optional non-ionic monomer structure unit, a branched structure unit, and an optional cationic monomer structure unit. The branched structure unit has at least one of structures represented by formula (1) or formula (2):

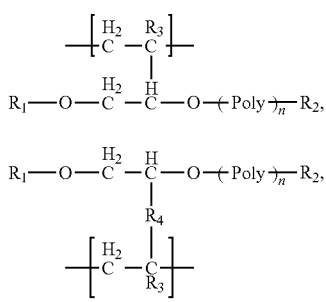

The polymer surfactant can realize both the high viscosity of the aqueous solution and the low oil water interfacial tension, and can be used as the oil displacement agent in the tertiary oil recovery.

12 Claims, 2 Drawing Sheets

(56) References Cited

U.S. PATENT DOCUMENTS

| | | | |
|---|---|---|---|
| 4,284,517 | A | 8/1981 | Chen et al. |
| 4,317,893 | A | 3/1982 | Chen et al. |
| 4,814,096 | A | 3/1989 | Evani |
| 7,691,260 | B2 | 4/2010 | Caneba |
| 11,118,099 | B2 * | 9/2021 | Li ............... C09K 8/588 |
| 2005/0197485 | A1 | 9/2005 | Saeki et al. |
| 2010/0197529 | A1 * | 8/2010 | Favero ............ C09K 8/584 507/224 |
| 2012/0058922 | A1 * | 3/2012 | Favero ............ C08K 5/005 507/225 |
| 2016/0122696 | A1 * | 5/2016 | Liu ............ C11D 3/2072 257/798 |
| 2017/0037299 | A1 * | 2/2017 | Li ............... C09K 8/588 |
| 2019/0153304 | A1 * | 5/2019 | Zelenev ............ C09K 8/604 |

FOREIGN PATENT DOCUMENTS

| | | |
|---|---|---|
| CN | 103409125 A | 11/2013 |
| CN | 104559985 A | 4/2015 |
| CN | 107382129 A | 11/2017 |
| CN | 107400188 A | 11/2017 |
| CN | 111349190 A | 6/2020 |
| DE | 4004883 A1 | 8/1991 |
| EA | 25834 B1 | 2/2017 |
| EA | 25880 B1 | 2/2017 |
| EA | 26294 B1 | 3/2017 |
| JP | 2008266637 A | 11/2008 |
| KR | 20170070728 A | 6/2017 |
| RU | 2666163 C1 | 9/2018 |
| RU | 2668104 C1 | 9/2018 |
| WO | 2020030428 A1 | 2/2020 |
| WO | 2020178378 A1 | 9/2020 |

OTHER PUBLICATIONS

Li, Juan et al.; "Research Progress of Polyoxyethylene Ether Surfactant for Oil Displacement"; Oilfiled Chemistry; vol. 33, No. 4; Dec. 25, 2016; pp. 756-760.

Zhang, Hao et al.; "Application of Hyperbranched Polymer in Oilfield Chemistry and Its Prospect Forecast"; Liaoning Chemical Industry; vol. 45, No. 8; Aug. 2016; pp. 1084-1086.

Raffa, Patrizio et al.; "Polymeric surfactants for enhanced oil recovery: A review"; Journal of Petroleum Science and Engineering; vol. 145; Jul. 7, 2016; pp. 723-733.

Co, Larry et al.; "Evaluation of functionalized polymeric surfactants for EOR applications in the Illinois Basin"; Journal of Petroleum Science and Engineering; vol. 134, Jul. 17, 2015; pp. 167-175.

* cited by examiner

POLYACRYLAMIDE-BASED SYMMETRIC BRANCHED POLYMER SURFACTANT AND A PROCESS FOR PREPARING THE SAME AND USE THEREOF

TECHNICAL FIELD

The present invention relates to the field of surfactants, in particular to a polyacrylamide-based symmetric branched polymer surfactant with a symmetric branched structure and a process for preparing the same and use thereof. The polymer surfactant can be used as an oil displacement agent in the tertiary oil recovery.

BACKGROUND TECHNOLOGY

Polymer flooding and surfactant flooding are the two most widely used methods in tertiary oil recovery. Surfactant flooding agents mainly utilize the ability of surfactants to reduce the surface tension of aqueous solutions, thereby improving oil recovery by reducing the interfacial tension between oil and water. Polymer flooding agents mainly use the strong viscosity-increasing ability of water-soluble polymers to increase the viscosity of the displacement phase in the reservoir, improve the mobility ratio, and adjust the permeability of the formation to achieve the goal of improving oil recovery. In practice, in order to further exert the synergistic effect of the two and maximize their contribution to the oil recovery, SP or ASP (A: alkali, S: surfactant, P: polymer) oil displacement systems have been developed both here and abroad, achieving both the mobility control and the interfacial activity improvement through the composite use. However, the characteristics of the two types of oil displacement agents are quite different, which makes them gradually separated due to the different characteristics of dilution, adsorption, degradation, diffusion and the like under the complex reservoir conditions, and thus cannot play an optimal role. In order to solve this problem, researchers have made attempts from two aspects: viscoelastic surfactants and polymer surfactants. Viscoelastic surfactants start from surfactants and achieve the goal of multiple effects in a single surfactant by forming wormlike micelles in surfactant solutions, thereby endowing the solution with viscoelasticity. Polymer surfactants start from polymers, and introduce interfacial active monomers into the polymer chain, thereby endowing them with the ability to reduce interfacial tension. Polymer surfactants belong to the macromolecular surfactant.

The macromolecular surfactant is a macromolecular compound with surface active function. It has a long research history. As early as the 1950s, Strauss et al. began to study the properties of polysoap aqueous solution. Polysoap is one of traditional macromolecular surfactants that can form micelles in water. Macromolecular surfactants are widely used in many fields such as coatings, detergents, catalysts, and material surface modification. In tertiary oil recovery, macromolecular surfactants can increase viscosity while reducing interfacial tension, and have a synergistic effect on increasing the number of capillaries. Additionally, the phase separation of traditional polymer-surfactant blended fluids can be prevented by replacing the mixture with a single-component compound. It has been reported in literatures that polymer surfactants can reduce oil-water interfacial tension while increasing the viscosity, but the degree of reducing IFT (interfacial tension) is limited. Therefore, compared with polymer or surfactant flooding, polymer surfactants is rarely used in EOR (Enhanced Oil Recovery).

In foreign literature reports, there have been many studies on the use of amphoteric polymers for EOR, while there are relatively few studies on the use of polymer surfactants for EOR in the true sense. The focus is mainly on the change of the rheological properties of the products, and there is less attention to interfacial activity. In a comprehensive review on the use of polymer surfactants for EOR published by Patrizio Raffa et al. in 2016, it was analyzed that the main reason why the research mainly focuses on rheological properties and neglects interface properties is that the appearance of association structures leads to a much higher viscosity of the product solution than ordinary polymers, thereby making the increase in viscosity become the main factor affecting EOR. However, there are also literatures that report more in-depth analysis. In an article by Larry Co et al. in 2015, the author used a polymer surfactant, where the interfacial tension could reduce to $10^{-1}$ mN/m and the viscosity was lower than that of traditional polymers. In the displacement experiments, the sweep efficiency of this polymer surfactant was lower than that of traditional polymers, but the recovery was 5% higher than that of traditional polymers (OOIP). The author also believes that this is mainly due to the role of these auxiliaries in both macroscopic sweep efficiency and microscopic displacement efficiency, while overcoming the chromatographic elution problem of traditional SP flooding.

In recent years, similar patents published abroad have mainly focused on the synthesis of hydrophobic association polymers, such as U.S. Pat. Nos. 3,984,333, 4,222,881, 4,284,517, 4,317,893, 4,814,096, 7,691,260. The focus is on the improvement of the rheology property of the solution by forming hydrophobic association structures after the addition of a small amount of surface active monomers. Therefore, in terms of product performance, only the viscosity-increasing ability is concerned, and less attention is paid to the interfacial activity of the product.

Due to the current synthesis of polymer surfactants is mainly achieved through copolymerization of acrylamide and surface active monomers, the difference in polymerization activity between comonomers limits the polymerization efficiency of surface active structural units. In Ye Peng et al.'s research work on Haibo III polymer surfactants through chromatographic separation, we can see that there is a significant difference in performance before and after purification with ethanol. It can be inferred that this polymer surfactant contains a large number of unpolymerized surface active monomers, which should be caused by the activity differences of different monomers during the polymerization process, or the product is not a true polymer surfactant but a binary mixture.

Due to the difficulty in achieving ultra-low interfacial tension, the effectiveness of polymer surfactants has been questioned, and its interfacial tension value is generally 0.1-15 mN/m. Although hydrophobically modified water-soluble polymers perform better on EOR than ordinary polymers, the importance of their interfacial behavior in improving the oil recovery efficiency is still unclear. The main problem faced by the current application of polymer surfactants is the inability to achieve lower interfacial tension while maintaining a higher viscosity of the product.

SUMMARY OF THE INVENTION

A polyacrylamide-based symmetric branched polymer surfactant is an approach proposed by the present invention to solve the existing problems. By introducing a cross-shaped branched chain on the main chain of polyacrylamide, a symmetric branched structure is constructed on the main chain, which enables the product to have higher interfacial activity and interfacial stability when arranged at the interface, and can effectively reduce the interfacial tension between the product aqueous solution and crude oil. At the same time, the present invention also relates to a multi-component composite redox initiation system, which can ensure the high molecular weight of the product while introducing a large amount of interfacial active monomers, thereby ensuring the high viscosity of the product aqueous solution. The dual effects of high viscosity and high interfacial activity ensure a high sweep coefficient and a high microscopic oil displacement efficiency of the product aqueous solution during the oil displacement process, therefore resulting in the higher increase in the crude oil recovery.

One of the technical problems to be solved by the present invention is to solve the problem of insufficient interfacial activity of the existing polymer surfactants. For this purpose, the present invention provides a symmetric branched polymer surfactant. By introducing a cross-shaped branched chain on the main chain of polyacrylamide, a symmetric branched structure is constructed on the main chain, which enables the product to have higher interfacial activity and interfacial stability when arranged at the interface, and can effectively reduce the interfacial tension between the product aqueous solution and crude oil.

The second technical problem to be solved by the present invention is to solve the problem that the molecular weight of the polymerization product is relatively low when the content of surface active monomer is relatively high. For this reason, the present invention provides a multi-component composite initiation system. By adjusting the formula and dosage of the initiation system, the concentration of free radicals effectively decomposed by the initiator in the whole polymerization process is controlled at a relatively low level, thereby effectively reducing the probability of bimolecular termination and increasing the molecular weight of the product.

The third technical problem to be solved by the present invention is to provide a process for preparing the polyacrylamide-based symmetric branched polymer surfactant corresponding to solving the first and second technical problems.

In order to solve one of the above-mentioned problems, on one hand, the present invention provides a polyacrylamide-based symmetric branched polymer surfactant, comprising an acrylamide structure unit, an anionic monomer structure unit, an optional non-ionic monomer structure unit, a branched structure unit, and an optional cationic monomer structure unit; wherein the branched structure unit has at least one of structures represented by formula (1) or formula (2):

(1)

(2)

wherein, $R_1$ is $C_1$-$C_{28}$ hydrocarbyl; $R_2$ is hydrogen atom, amino, carboxylic acid group, sulfonic acid group, sulfuric acid group, phosphoric acid group, mercapto, halogen; $R_3$ is hydrogen atom or methyl; $R_4$ is —O—, —CH$_2$—, —CH$_2$OCH$_2$— or —CH$_2$O—; n is the number of Poly, Poly is independently at least one of a and b are each independently 0-40, and a and b are not 0 at the same time.

Preferably, $R_1$ is $C_5$-$C_{20}$ hydrocarbyl; $R_2$ is hydrogen atom, amino, carboxylic acid group, or sulfonic acid group; a is 5-24, b is 0-5.

In any of the above technical solutions, said acrylamide structure unit is provided by the acrylamide monomer, said anionic monomer structure unit is provided by the anionic monomer, said cationic monomer structure unit is provided by the cationic monomer, said non-ionic monomer structure unit is provided by the non-ionic monomer, and said branched structure unit is provided by the symmetric branched monomer.

In any of the above technical solutions, the symmetric branched monomer is commercially available or prepared with methods known in the prior art.

In any of the above technical solutions, the polymer surfactant is obtained by reacting a reaction system containing the following components, in parts by weight:

| | |
|---|---|
| acrylamide | 5-25 parts; preferably 10-25 parts; |
| anionic monomer | 1-25 parts; preferably 2-20 parts; |
| cationic monomer | 0-25 parts; preferably 0-15 parts; |
| non-ionic monomer | 1-10 parts; preferably 1-8 parts; and |
| symmetric branched monomer | 1-20 parts; preferably 1-12 parts. |

In any of the above technical solutions, for the polyacrylamide-based symmetric branched polymer surfactant, the anionic monomer is selected from at least one of acrylic acid, methacrylic acid, sodium vinylsulfonate, p-vinylbenzenesulfonic acid, maleic acid, fumaric acid, vinylbenzenesulfonic acid, allylsulfonic acid, allylbenzenesulfonic acid, 2-acrylamido-2-methylpropanesulfonic acid, and alkali metal salts or ammonium salts thereof.

In any of the above technical solutions, for the polyacrylamide-based symmetric branched polymer surfactant, the cationic monomer is selected from at least one of methacryloxyethyltrimethylammonium chloride, 2-acrylamido-2-methylpropyltrimethylammonium chloride, dimethylethylallylammonium chloride, dimethyldiallylammonium chloride, acryloxyethyltrimethylammonium chloride, acryloxyethyldimethylbenzylammonium chloride, and methacryloxyethyldimethylbenzylammonium chloride.

In any of the above technical solutions, for the polyacrylamide-based symmetric branched polymer surfactant, the non-ionic monomer is selected from at least one of methacrylamide, dimethylacrylamide, diethylacrylamide, hydroxymethylacrylamide, hydroxyethylacrylamide, dimethylaminopropylmethacrylamide, hydroxymethyl methacrylate, hydroxyethyl methacrylate, dimethylaminoethyl methacrylate, vinyl pyrrolidone, and tert-butyl acrylamide.

In any of the above technical solutions, for the polyacrylamide-based symmetric branched polymer surfactant, the symmetric branched monomer is selected from at least one of the monomers having the structures represented by formula (3) to formula (12):

(3)

(4)

(5)

(6)

(7)

(8)

(9)

(10)

(11)

(12)

wherein, $R_1$ is $C_1$-$C_{28}$ hydrocarbyl, preferably $C_5$-$C_{20}$ hydrocarbyl; $R_2$ is hydrogen atom, amino, carboxylic acid group, sulfonic acid group, sulfuric acid group, phosphoric acid group, mercapto, or halogen, preferably hydrogen atom, amino, carboxylic acid group, or sulfonic acid group; a and b are each independently 0-40 and a and b are not 0 at the same time, a is preferably 5-24, b is preferably 0-5.

In any of the above technical solutions, said reaction system further contains at least one of the following components, in parts by weight:

| | |
|---|---|
| oxidizing agent | 0.0001-0.005 parts; preferably 0.0001-0.002 parts; |
| reducing agent | 0.0001-0.005 parts; preferably 0.0001-0.002 parts; |
| azo initiator | 0.0001-0.005 parts; preferably 0.0001-0.002 parts; |
| water | 5-150 parts; preferably 20-120 parts; |
| defoamer | 0.001-0.01 parts; preferably 0.001-0.005 parts; |
| chelating agent | 0.001-0.5 parts; preferably 0.001-0.2 parts; |
| cosolvent | 0.001-0.5 parts; preferably 0.001-0.2 parts. |

In any of the above technical solutions, the oxidizing agent, the reducing agent and the azo initiators are all the components of the composite initiator system.

In any of the above technical solutions, for the polyacrylamide-based symmetric branched polymer surfactant, the oxidizing agent is preferably selected from at least one of persulfates such as potassium persulfate or sodium persulfate, hydrogen peroxide, benzoyl peroxide, potassium bromate, tert-butyl hydroperoxide, lauroyl peroxide, cumene hydroperoxide, di-tert-butyl peroxide, dicumyl peroxide, t-butyl peroxybenzoate, tert-butyl peroxypivalate, methylethyl ketone peroxide, cyclohexanone peroxide, diisopropyl peroxydicarbonate, and dicyclohexyl peroxydicarbonate;

the reducing agent is preferably selected from at least one of sodium bisulfite, sodium thiosulfate, sodium dithionite, sodium pyrosulfite, tetramethyl ethylene diamine, ferrous ammonium sulfate, sodium formaldehyde sulfoxylate, N,N-dimethylaniline, tartaric acid, ferrous sulfate, N,N-diethylaniline, ferrous pyrophosphate, silver nitrate, mercaptan, ferrous chloride, tetraethyleneimine, glycerol, and pentaerythritol;

the azo initiator is preferably selected from at least one of azodiisobutyronitrile, azodiisovaleronitrile, azodiisoheptylonitrile, dimethyl azodiisobutyrate, azodiisobutylamidine hydrochloride, 2,2'-azo[2-(2-imidazolin-2-yl)propane] dihydrochloride, azodi(2,5-dimethyl-6-carboxyl)capronitrile, and 4,4'-azodi(4-cyanovaleric acid);

the cosolvent is preferably selected from at least one of urea, ammonia water, sodium formate, and sodium acetate;

the defoamer is preferably an organic silicon aqueous defoamer, for example, any of commercially available organic silicon aqueous defoamers;

the chelating agent is preferably selected from at least one of ethylenediamine tetraacetic acid, ethylenediaminetetraacetic acid disodium salt, and ethylenediaminetetraacetic acid tetrasodium salt.

in any of the above technical solutions, the polyacrylamide-based symmetric branched polymer surfactant can be obtained with the aqueous solution polymerization process by using acrylamide, an anionic monomer, an optional non-ionic monomer, a symmetric branched monomer, and an optional cationic monomer.

On the other hand, the present invention provides a process for preparing the polyacrylamide-based symmetric branched polymer surfactant, wherein the components including acrylamide, an anionic monomer, an optional non-ionic monomer, a symmetric branched monomer, and an optional cationic monomer are subjected to aqueous solution polymerization.

Preferably, the preparation process comprises the following steps:

1) dissolving a part of the components including acrylamide, an anionic monomer, an optional non-ionic monomer, a symmetric branched monomer, and an optional cationic monomer in water;
2) adjusting the pH value of the solution to 6-12, and adjusting the temperature of the solution to 0-25° C.;
3) Under an inert atmosphere and under an adiabatic condition, adding the remaining components to carry out the polymerization reaction, and after the temperature of the reaction system rises to the highest temperature, maintaining the temperature constant for 1-8 hours to obtain the polymer surfactant.

In any of the above technical solutions, preferably, the chelating agent, the defoamer and the cosolvent are dissolved in water in step 1); and the composite initiator system including the oxidizing agent, the reducing agent and the azo initiator is added in step 3).

According to a preferred embodiment of the present invention, the process for preparing the polyacrylamide-based symmetric branched polymer surfactant comprises the following steps:

1) dissolving the determined amounts of the acrylamide monomer, the anionic monomer, the optional cationic monomer, the optional non-ionic monomer, the symmetric branched monomer, the chelating agent, the defoamer, and the co-solvent in a certain amount of deionized water;
2) adding sodium hydroxide to adjust the pH value to 6-12 to prepare an aqueous solution, and placing the solution in a refrigerator or a cold water bath to adjust the temperature to 0-25° C.;
3) adding the above-mentioned solution into an adiabatic reactor, and passing an inert gas into the reactor to remove oxygen gas, the time period for which is 30-60 minutes;
4) dissolving the components in the composite initiator in water respectively to each form an aqueous solution, successively adding these aqueous solutions to the reactor, and continuing the passing of the inert gas while stirring;
5) stopping the passing of the inert gas after the polymerization reaction starts, and after the temperature of the reaction system rises to the highest temperature, maintaining the temperature constant for 1-8 hours to obtain the polymerization product;
6) cutting the polymerization product into pellets, which are dried at 70-90° C., and then pulverized to produce the polyacrylamide-based symmetric branched polymer surfactant.

The third aspect of the present invention is to provide the use of the polyacrylamide-based symmetric branched polymer surfactant, or the polyacrylamide-based symmetric branched polymer surfactant obtained from the preparation process in the oil displacement agent.

The polyacrylamide-based symmetric branched polymer surfactant, obtained with the technical solution of the present invention, has a viscosity of greater than 10 mPa·s at 85° C. at a concentration of 2000 ppm in 30000 mg/L saline and a molecular weight of greater than $1000 \times 10^4$; and the interfacial tension between the saline solution and crude oil can reach $10^2$ mN/m.

The polyacrylamide-based symmetric branched polymer surfactant obtained with the technical solution of the present invention has a symmetric branched structure as shown below, so when the product molecules are arranged at the oil-water interface, it can be more stable, and then have higher interfacial activity.

This structure is formed after the polymerization of branched monomers on the polymer chain. Taking formula (3) as an example, when the double bond is polymerized into the main chain, two ends $R_1$ and $R_2$ will respectively form two branched structures on both sides of the main chain of the polymer, i.e. the symmetric branched structures described herein.

In the present invention, the hydrocarbyl refers to alkyl, alkenyl and alkynyl, and the hydrocarbyl can be linear, branched or cyclic. Preferably, said hydrocarbyl is an alkyl. More preferably, said hydrocarbyl is a straight chain alkyl.

The polyacrylamide-based symmetric branched polymer surfactant obtained with the technical solution of the present invention can simultaneously realize a high viscosity of the aqueous solution and a low oil-water interfacial tension, therefore in the oil displacement experiment, the aqueous solution of the polyacrylamide-based symmetric branched polymer surfactant obtained by the present invention will accomplish a recovery much higher than those of the common polymer surfactants or polymers.

DETAILED DESCRIPTION

The present invention provides the following technical solutions.

1. A polyacrylamide-based symmetric branched polymer surfactant, comprising an acrylamide structure unit, an anionic monomer structure unit, an optional non-ionic monomer structure unit, a branched structure unit, and an optional cationic monomer structure unit; wherein the branched structure unit has at least one of structures represented by formula (1) or formula (2):

(1)

(2)

wherein, $R_1$ is $C_1$-$C_{28}$ hydrocarbyl; $R_2$ is hydrogen atom, amino, carboxylic acid group, sulfonic acid group, sulfuric acid group, phosphoric acid group, mercapto, halogen; $R_3$ is hydrogen atom or methyl; $R_4$ is —O—, —CH$_2$—, —CH$_2$OCH$_2$— or —CH$_2$O—; n is the number of Poly, Poly is independently at least one of a and b are each independently 0-40, and a and b are not 0 at the same time.

2. The polyacrylamide-based symmetric branched polymer surfactant according to any of the aforementioned technical solutions, which is characterized in that:
$R_1$ is $C_5$-$C_{20}$ hydrocarbyl; $R_2$ is hydrogen atom, amino, carboxylic acid group, or sulfonic acid group;
a is 5-24, b is 0-5.

3. The polyacrylamide-based symmetric branched polymer surfactant according to any of the aforementioned technical solutions, which is characterized in that the polymer surfactant is obtained by reacting a reaction system containing the following components, in parts by weight:

| | |
|---|---|
| acrylamide | 5-25 parts; preferably 10-25 parts; |
| anionic monomer | 1-25 parts; preferably 2-20 parts; |
| cationic monomer | 0-25 parts; preferably 0-15 parts; |
| non-ionic monomer | 1-10 parts; preferably 1-8 parts; |
| symmetric branched monomer | 1-20 parts; preferably 1-12 parts. |

4. The polyacrylamide-based symmetric branched polymer surfactant according to any of the aforementioned technical solutions, which is characterized in that:
the anionic monomer is selected from at least one of acrylic acid, methacrylic acid, sodium vinylsulfonate, p-vinylbenzenesulfonic acid, maleic acid, fumaric acid, vinylbenzenesulfonic acid, allylsulfonic acid, allylbenzenesulfonic acid, 2-acrylamido-2-methylpropanesulfonic acid, and alkali metal salts or ammonium salts thereof; and/or,
the cationic monomer is selected from at least one of methacryloxyethyltrimethylammonium chloride, 2-acrylamido-2-methylpropyltrimethylammonium chloride, dimethylethylallylammonium chloride, dimethyldiallylammonium chloride, acryloxyethyltrimethylammonium chloride, acryloxyethyldimethylbenzylammonium chloride, and methacryloxyethyldimethylbenzylammonium chloride; and/or,
the non-ionic monomer is selected from at least one of methacrylamide, dimethylacrylamide, diethylacrylamide, hydroxymethylacrylamide, hydroxyethylacrylamide, dimethylaminopropylmethacrylamide, hydroxymethyl methacrylate, hydroxyethyl methacrylate, dimethylaminoethyl methacrylate, vinyl pyrrolidone, tert-butyl acrylamide.

5. The polyacrylamide-based symmetric branched polymer surfactant according to any of the aforementioned technical solutions, which is characterized in that:
the symmetric branched monomer is selected from at least one of the monomers having the structures represented by formula (3) to formula (12),

(3)

(4)

(5)

(6)

(7)

(8)

(9)

-continued (10)

(11)

(12)

wherein, $R_1$ is $C_1$-$C_{28}$ hydrocarbyl; $R_2$ is hydrogen atom, amino, carboxylic acid group, sulfonic acid group, sulfuric acid group, phosphoric acid group, mercapto, or halogen; $R_3$ is hydrogen atom or methyl; a and b are each independently 0-40, and a and b are not 0 at the same time.

6. The polyacrylamide-based symmetric branched polymer surfactant according to any of the aforementioned technical solutions, which is characterized in that:
said reaction system further contains at least one of the following components, in parts by weight:

| | |
|---|---|
| oxidizing agent | 0.0001-0.005 parts; preferably 0.0001-0.002 parts; |
| reducing agent | 0.0001-0.005 parts; preferably 0.0001-0.002 parts; |
| azo initiator | 0.0001-0.005 parts; preferably 0.0001-0.002 parts; |
| water | 5-150 parts; preferably 20-120 parts; |
| defoamer | 0.001-0.01 parts; preferably 0.001-0.005 parts; |
| chelating agent | 0.001-0.5 parts; preferably 0.001-0.2 parts; |
| cosolvent | 0.001-0.5 parts; preferably 0.001-0.2 parts. |

7. The polyacrylamide-based symmetric branched polymer surfactant according to technical solution 6, which is characterized in that:
the oxidizing agent is selected from at least one of potassium persulfate, sodium persulfate, hydrogen peroxide, benzoyl peroxide, potassium bromate, tert-butyl hydroperoxide, lauroyl peroxide, cumene hydroperoxide, di-tert-butyl peroxide, dicumyl peroxide, t-butyl peroxybenzoate, tert-butyl peroxypivalate, methylethyl ketone peroxide, cyclohexanone peroxide, diisopropyl peroxydicarbonate, dicyclohexyl peroxydicarbonate; and/or,
the reducing agent is selected from at least one of sodium bisulfite, sodium thiosulfate, sodium dithionite, sodium pyrosulfite, tetramethyl ethylene diamine, ferrous ammonium sulfate, sodium formaldehyde sulfoxylate, N,N-dimethylaniline, tartaric acid, ferrous sulfate, N,N-diethylaniline, ferrous pyrophosphate, silver nitrate, mercaptan, ferrous chloride, tetraethyleneimine, glycerol, pentaerythritol; and/or,
said azo initiator is selected from at least one of azodiisobutyronitrile, azodiisovaleronitrile, azodiisoheptylonitrile, dimethyl azodiisobutyrate, azodiisobutylamidine hydrochloride, 2,2'-azo[2-(2-imidazolin-2-yl) propane] dihydrochloride, azodi(2,5-dimethyl-6-carboxyl)capronitrile, 4,4'-azodi(4-cyanovaleric acid); and/or,
said cosolvent is selected from at least one of urea, ammonia water, sodium formate, and sodium acetate; and/or,
the defoamer is an organic silicon aqueous defoamer; and/or,
the chelating agent is selected from at least one of ethylenediamine tetraacetic acid, ethylenediaminetetraacetic acid disodium salt, and ethylenediaminetetraacetic acid tetrasodium salt.

8. The polyacrylamide-based symmetric branched polymer surfactant according to any of the aforementioned technical solutions, which has at least 1, at least 2, at least 3, at least 4, at least 5, at least 6, at least 7 or all of the following properties:
(1) Solution viscosity: 8-15 mPa·s;
(2) Interfacial tension: 0.010-0.040 mN/m;
(3) Viscosity-average molecular weight: 750-1500×10$^4$, preferably 900-1350×10$^4$;
(4) Density: 1.1-1.5 g/cm$^3$, preferably 1.2-1.3 g/cm$^3$;
(5) Filtration ratio: ≤1.5;
(6) Solid content: ≥89%;
(7) Dissolution time: ≤2 hours; and
(8) Insoluble content: ≤0.2%,
wherein, the above-mentioned properties (1) and (2) are measured according to GB/T 1632 "Determination of viscosity number and limiting viscosity number of polymers in dilute solution" and SY/T 5370-2018 "Test method for surface tension and interfacial tension". The specific method is: dissolving the sample in 30000 mg/L saline solution (500 mg/L each of calcium and magnesium ions, and the rest are sodium ions and chloride ions) to prepare a sample solution with a concentration of 2000 mg/L, and using a rotational rheometer to measure the solution viscosity of the sample solution at 85° C., and a shear rate of 7.34 s$^{-1}$; using an interfacial tensiometer to measure the interfacial tension between the sample solution and crude oil; crude oil: a crude oil from block Ming 16 of Zhongyuan Oilfield with a viscosity of 1.25 mPa·s (reservoir oil viscosity); The above-mentioned property (3) is determined by the viscosity-average method, according to GB/T 1632 "Determination of viscosity number and limiting viscosity number of polymers in dilute solution", using an ubbelohde viscometer; The above properties (4) to (8) are determined according to Q/SH 0237-2008 "Technical specification of polyacrylamide for oil displacement".

9. The polyacrylamide-based symmetric branched polymer surfactant according to any of the aforementioned technical solutions, which is characterized in that, in the proton nuclear magnetic resonance spectrum (400 MHz, deuterated methanol as solvent) of the surfactant, the characteristic peak(s) appear at one, two, three, four, five or six of the following chemical shifts: δ 1.21±0.1 ppm, δ 1.73±0.1 ppm, δ 2.12±0.1 ppm, δ 3.34±0.1 ppm, δ 3.60±0.1 ppm, and δ 3.80±0.1 ppm; for example, 6 1.21±0.05 ppm, δ 1.73±0.05 ppm, δ 2.12±0.05 ppm, δ 3.34±0.05 ppm, δ 3.60±0.05 ppm, and 6 3.80±0.05 ppm; or for example, δ 1.21±0.02 ppm, δ 1.73±0.02 ppm, δ 2.12±0.02 ppm, δ 3.34±0.02 ppm, δ 3.60±0.02 ppm, and δ 3.80±0.02 ppm; or for example, δ 1.21 ppm, δ 1.73 ppm, δ 2.12 ppm, δ 3.34 ppm, δ 3.60 ppm, and δ 3.80 ppm.

10. A process for preparing the polyacrylamide-based symmetric branched polymer surfactant according to any one of claims 1-9, wherein the components including acrylamide, an anionic monomer, an optional non-ionic monomer, a symmetric branched monomer, and an optional cationic monomer are subjected to aqueous solution polymerization.

11. The preparation process according to technical solution 10, which is characterized in that said process comprises the following steps:
   1) dissolving a part of the components including acrylamide, an anionic monomer, an optional non-ionic monomer, a symmetric branched monomer, and an optional cationic monomer in water;
   2) adjusting the pH value of the solution to 6-12, and adjusting the temperature of the solution to 0-25° C.;
   3) Under an inert atmosphere and under an adiabatic condition, adding the remaining components to carry out the polymerization reaction, and after the temperature of the reaction system rises to the highest temperature, maintaining the temperature constant for 1-8 hours to obtain the polymer surfactant.

12. Use of the polyacrylamide-based symmetric branched polymer surfactant according to any of technical solutions 1-9, or the polyacrylamide-based symmetric branched polymer surfactant obtained from the preparation process according to any of technical solutions 10-11 in the oil displacement agent.

The present invention is specifically described below in conjunction with specific embodiments. It is necessary to point out herein that the following examples/embodiments are only used for the further description of the present invention, and cannot be interpreted as a limitation to the protection scope of the present invention. Those skilled in the art can understand some non-essential improvements and modifications to the present invention made according to the content of the present invention still belong to the protection scope of the present invention.

In the specific embodiment of the present invention, except that the symmetric branched monomers are self-made, all other raw materials used are commercially available.

Crude oil: a crude oil from block Ming 16 of Zhongyuan Oilfield with a viscosity of 1.25 mPa·s (reservoir oil viscosity).

Performance Measurement Method:
   (1) Solution viscosity and interfacial tension are measured according to GB/T 1632 "Determination of viscosity number and limiting viscosity number of polymers in dilute solution" and SY/T 5370-2018 "Test method for surface tension and interfacial tension". Specific process is as follows: dissolving the sample in 30000 mg/L saline solution (500 mg/L each of calcium and magnesium ions, and the rest are sodium ions and chloride ions) to prepare a sample solution with a concentration of 2000 mg/L, and using a rotational rheometer (e.g. Haake rheometer) to measure the solution viscosity of the sample solution at 85° C., and a shear rate of 7.34 $s^{-1}$; using an interfacial tensiometer such as TX500c interfacial tensiometer to measure the interfacial tension between the sample solution and crude oil;
   (2) Molecular weight: the viscosity-average method, measured according to GB/T 1632 "Determination of viscosity number and limiting viscosity number of polymers in dilute solution", using an ubbelohde viscometer;
   (3) Density, filtration ratio, solid content, dissolution time, and insoluble content: determined according to Q/SH 0237-2008 "Technical specification of polyacrylamide for oil displacement".

Measuring Instruments and Conditions of Proton Nuclear Magnetic Resonance Spectrum:
   Using a high-resolution nuclear magnetic resonance spectrometer, e.g. Varian Mercury Plus 400 MHz nuclear magnetic resonance instrument, measured under the following conditions: at 25° C., with heavy water as solvent, at a frequency of 400 MHz, a spectral width of 6410.3 Hz, a 90° pulse width of 6.450 s, an acquisition time of 4 s and a delay time of 18 s.

Measuring Instruments and Conditions of Infrared Spectrum:
   Using an infrared spectrometer to test the infrared absorption spectrum of the sample, for example, using American Nicolet 560-type infrared spectrometer, room temperature, potassium bromate tablet test, resolution of 4 $cm^1$.

Example 1

25 g of acrylamide monomer, 3 g of 2-acrylamido-2-methylpropanesulfonic acid, 3.6 g of tert-butyl acrylamide, 0.5 g of methacryloxyethyltrimethylammonium chloride, 1.25 g of the branched monomer represented by formula (7) (wherein $R_1$ is a straight chain alkyl having 12 carbon atoms, $R_2$ and $R_3$ are both hydrogen atom, a is 6, b is 1), 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane]dihydrochloride, and 0.00005 g of 4,4'-azodi(4-cyanovaleric acid) were dissolved in 2 g of deionized water respectively, and then successively added to reactor. The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Example 1 was measured, and the results were as follows: density was in the range of 1.2-1.3 $g/cm^3$; filtration ratio: ≤1.5; solid content: ≥89%; dissolution time ≤2 hours; and insoluble content ≤0.2%.

The sample obtained in Example 1 was dissolved in a 30000 mg/L saline solution under stirring, and a product solution with a concentration of 2000 mg/L was prepared. The solution viscosity was measured at 85° C. by using the coaxial cylinder mode of a Haake rheometer. The cutting rate is 7.34 $s^{-1}$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1. The above-mentioned saline solution contained 500 mg/L of calcium and magnesium ions each, and the rest were sodium ions and chloride ions.

It can be seen that the sample obtained in Example 1 had a viscosity of 13 mPa·s in 30000 mg/L saline, an interfacial tension of 0.027 mN/m, and a molecular weight of $1350 \times 10^4$ (13.5 million), and could increase the recovery by 12.3% after the water flooding. The above performance data could prove that the product effectively played the role of expanding the swept volume and increasing the microscopic displacement efficiency during the oil displacement process.

Figure 1:
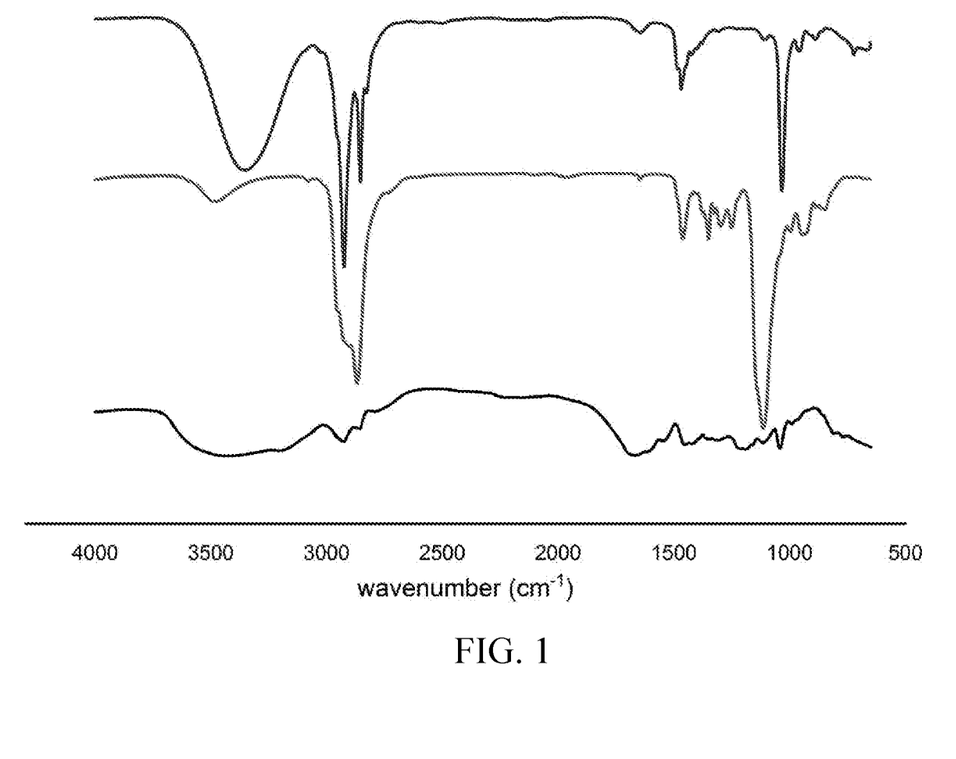
FIG. 1 is an infrared contrast spectrum of the sample and comonomers of Example 1.
Figure 2:
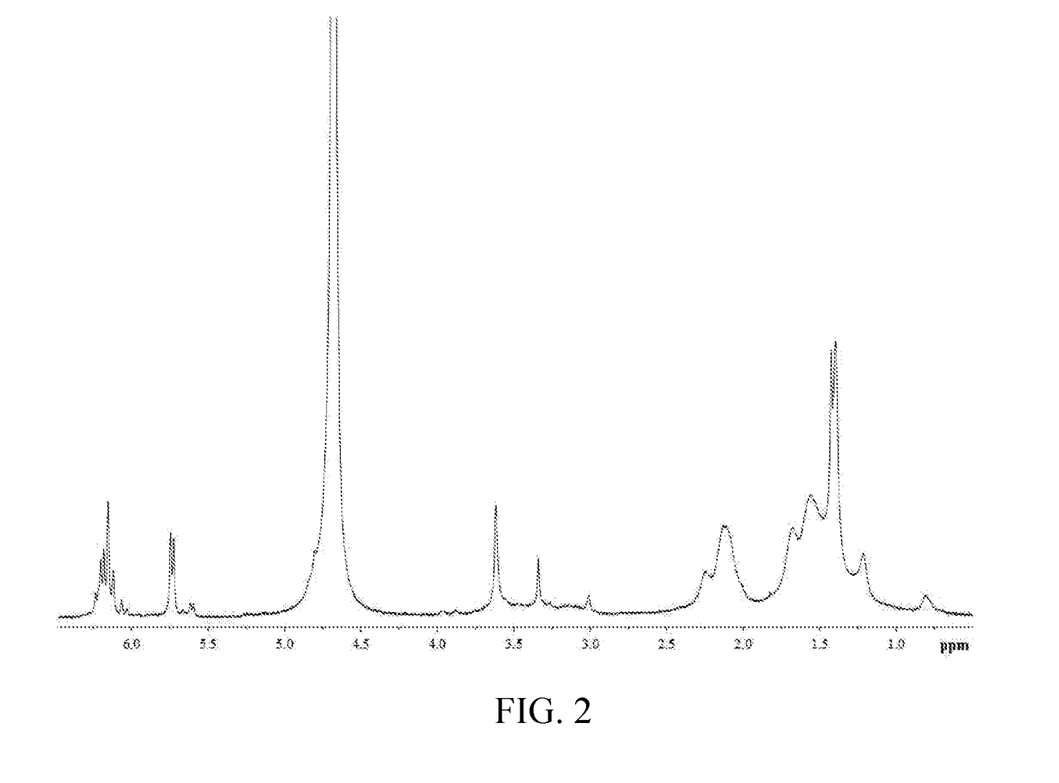
FIG. 2 is a proton nuclear magnetic resonance spectrum of the sample of Example 1.

The infrared contrast spectrum of the sample and comonoers of Example 1 and the proton nuclear magnetic resonance spectrum of the sample of Example 1 were shown in FIG. 1 and FIG. 2 respectively. In the nuclear magnetic resonance spectrum, the characteristic peaks at least appeared at the following chemical shifts: $\delta$ 1.21 ppm, $\delta$ 1.73 ppm, $\delta$ 2.12 ppm, $\delta$ 3.34 ppm, $\delta$ 3.60 ppm, and $\delta$ 3.80 ppm.

Example 2

25 g of acrylamide monomer, 3 g of 2-acrylamido-2-methylpropanesulfonic acid, 3.6 g of tert-butyl acrylamide, 0.5 g of methacryloxyethyltrimethylammonium chloride, 1.25 g of the branched monomer represented by formula (3) (wherein $R_1$ is a straight chain alkyl having 12 carbon atoms, $R_2$ and $R_3$ are both hydrogen atom, a is 6, b is 0), 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane]dihydrochloride, and 0.00005 g of 4,4'-azodi(4-cyanovaleric acid) were dissolved in 2 g of deionized water respectively, and then successively added to reactor. The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Example 2 was measured, and the results were as follows: density was in the range of 1.2-1.3 g/cm$^3$; filtration ratio: ≤1.5; solid content: ≥89%; dissolution time ≤2 hours; and insoluble content ≤0.2%.

The sample obtained in Example 2 was dissolved in a 30000 mg/L saline solution under stirring, and a product solution with a concentration of 2000 mg/L was prepared. The solution viscosity was measured at 85° C. by using the coaxial cylinder mode of a Haake rheometer. The cutting rate is 7.34 s$^{-1}$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1.

It can be seen that the sample obtained in Example 2 had a viscosity of 10.5 mPa·s in 30000 mg/L saline, an interfacial tension of 0.033 mN/m, and a molecular weight of $1180 \times 10^4$ (11.8 million), and could increase the recovery by 11.7% after the water flooding. The above performance data could prove that the product effectively played the role of expanding the swept volume and increasing the microscopic displacement efficiency during the oil displacement process. Compared with Example 1, there was a greater difference between the reactivity ratio of the polymerized double bond in the branched monomer used in Example 2 and that of acrylamide, so the molecular weight was affected to a larger extent, and meanwhile, the interfacial tension was also slightly higher, and therefore the recovery was slightly lower than that of Example 1.

Example 3

25 g of acrylamide monomer, 3 g of 2-acrylamido-2-methylpropanesulfonic acid, 3.6 g of tert-butyl acrylamide, 0.5 g of methacryloxyethyltrimethylammonium chloride, 2.5 g of the branched monomer represented by formula (7) (wherein $R_1$ is a straight chain alkyl having 12 carbon atoms, $R_2$ and $R_3$ are both hydrogen atom, a is 6, b is 1), 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane]dihydrochloride, 0.00005 g of 4,4'-azodi(4-cyanovaleric acid) were dissolved in 2 g of deionized water respectively, and then successively added to reactor. The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Example 3 was measured, and the results were as follows: density was in the range of 1.2-1.3 g/cm$^3$; filtration ratio: ≤1.5; solid content: ≥89%; dissolution time ≤2 hours; and insoluble content ≤0.2%.

The sample obtained in Example 3 was dissolved in a 30000 mg/L saline solution under stirring, and a product solution with a concentration of 2000 mg/L was prepared.

The solution viscosity was measured at 85° C. by using the coaxial cylinder mode of a Haake rheometer. The cutting rate is 7.34 s$^{-1}$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1.

It can be seen that the sample obtained in Example 3 had a viscosity of 11 mPa·s in 30000 mg/L saline, an interfacial tension of 0.021 mN/m, and a molecular weight of 1200×10$^4$ (12 million), and could increase the recovery by 12.7% after the water flooding. The above performance data could prove that the product effectively played the role of expanding the swept volume and increasing the microscopic displacement efficiency during the oil displacement process. Compared with Example 1, Example 3 had a higher branched monomer content, therefore the interfacial tension was lower, the interface activity was better, and the increase in the recovery was the highest.

Example 4

25 g of acrylamide monomer, 3 g of acrylic acid, 3.6 g of tert-butyl acrylamide, 0.5 g of 2-acrylamido-2-methylpropyltrimethylammonium chloride, 2.5 g of the branched monomer represented by formula (11) (wherein $R_1$ is a straight chain alkyl having 18 carbon atoms, $R_2$ is a carboxylic acid group, $R_3$ is methyl, a is 10, b is 0), 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane]dihydrochloride, and 0.00005 g of 4,4'-azodi(4-cyanovaleric acid) were dissolved in 2 g of deionized water respectively, and then successively added to reactor. The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Example 4 was dissolved in a 30000 mg/L saline solution under stirring, and a product solution with a concentration of 2000 mg/L was prepared. The solution viscosity was measured at 85° C. by using the coaxial cylinder mode of a Haake rheometer. The cutting rate is 7.34 s$^{-1}$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1.

The sample obtained in Example 4 was measured, and the results were as follows: density was in the range of 1.2-1.3 g/cm$^3$; filtration ratio: ≤1.5; solid content: ≥89%; dissolution time ≤2 hours; and insoluble content ≤0.2%.

It can be seen that the sample obtained in Example 4 had a viscosity of 9.8 mPa·s in 30000 mg/L saline, an interfacial tension of 0.019 mN/m, and a molecular weight of 1050×10$^4$ (10.5 million), and could increase the recovery by 10.8% after the water flooding. The above performance data could prove that the product effectively played the role of expanding the swept volume and increasing the microscopic displacement efficiency during the oil displacement process. Compared with Example 1, the branched monomer used in Example 4 had a slightly worse reactivity ratio, so the molecular weight was slightly lower, and the interface activity was better, so the recovery was more affected by the swept volume, and so the recovery was slightly lower.

Example 5

10 g of acrylamide monomer, 20 g of 2-acrylamido-2-methylpropanesulfonic acid, 8.5 g of tert-butyl acrylamide, 15 g of 2-acrylamido-2-methylpropyltrimethylammonium chloride, 12 g of the branched monomer represented by formula (11) (wherein $R_1$ is a straight chain alkyl having 18 carbon atoms, $R_2$ is a carboxylic acid group, $R_3$ is methyl, a is 10, b is 0), 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane]dihydrochloride, and 0.00005 g of 4,4'-azodi(4-cyanovaleric acid) were dissolved in 2 g of deionized water respectively, and then successively added to reactor. The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Example 5 was measured, and the results were as follows: density was in the range of 1.2-1.3 g/cm$^3$; filtration ratio: ≤1.5; solid content: ≥89%; dissolution time ≤2 hours; and insoluble content ≤0.2%.

The sample obtained in Example 5 was dissolved in a 30000 mg/L saline solution under stirring, and a product solution with a concentration of 2000 mg/L was prepared. The solution viscosity was measured at 85° C. by using the coaxial cylinder mode of a Haake rheometer. The cutting rate is 7.34 s$^1$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1.

It can be seen that the sample obtained in Example 5 had a viscosity of 8.8 mPa·s in 30000 mg/L saline, an interfacial tension of 0.017 mN/m, and a molecular weight of $900 \times 10^4$ (9.0 million), and could increase the recovery by 10.1% after the water flooding. The above performance data could prove that the product effectively played the role of expanding the swept volume and increasing the microscopic displacement efficiency during the oil displacement process. Compared with Example 4, the amount of the branched monomer used in Example 5 was higher, and the amount of the ionic monomer was also higher, so the molecular weight was lower and the interface activity was higher. However, the decrease in viscosity had a greater influence than the increase in interface activity, so the recovery was slightly lower than that in Example 4.

Example 6

25 g of acrylamide monomer, 20 g of 2-acrylamido-2-methylpropanesulfonic acid, 8.5 g of tert-butyl acrylamide, 12 g of the branched monomer represented by formula (9) (wherein $R_1$ is a straight chain alkyl having 18 carbon atoms, $R_2$ is a carboxylic acid group, $R_3$ is methyl, a is 10, b is 0), 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane] dihydrochloride, and 0.00005 g of 4,4'-azodi(4-cyanovaleric acid) were dissolved in 2 g of deionized water respectively, and then successively added to reactor.

The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Example 6 was measured, and the results were as follows: density was in the range of 1.2-1.3 g/cm$^3$; filtration ratio: ≤1.5; solid content: ≥89%; dissolution time ≤2 hours; and insoluble content ≤0.2%.

The sample obtained in Example 6 was dissolved in a 30000 mg/L saline solution under stirring, and a product solution with a concentration of 2000 mg/L was prepared. The solution viscosity was measured at 85° C. by using the coaxial cylinder mode of a Haake rheometer. The cutting rate is 7.34 s$^1$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1.

It can be seen that the sample obtained in Example 6 had a viscosity of 9.2 mPa·s in 30000 mg/L saline, an interfacial tension of 0.020 mN/m, and a molecular weight of $920 \times 10^4$ (9.2 million), and could increase the recovery by 10.4% after the water flooding. The above performance data could prove that the product effectively played the role of expanding the swept volume and increasing the microscopic displacement efficiency during the oil displacement process.

Comparative Example 1

25 g of acrylamide monomer, 3 g of 2-acrylamido-2-methylpropanesulfonic acid, 3.6 g of tert-butyl acrylamide, 0.5 g of methacryloxyethyltrimethylammonium chloride, 2.5 g of hexadecyldimethylallylammonium chloride, 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane]dihydrochloride, and 0.00005 g of 4,4'-azodi(4-cyanovaleric acid) were dissolved in 2 g of deionized water respectively, and then successively added to reactor. The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Comparative Example 1 was dissolved in a 30000 mg/L saline solution under stirring, and a product solution with a concentration of 2000 mg/L was prepared. The solution viscosity was measured at 85° C. by using the coaxial cylinder mode of a Haake rheometer. The cutting rate is 7.34 s$^{-1}$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1.

It can be seen that the sample obtained in Comparative Example 1 had a viscosity of 23 mPa·s in 30000 mg/L saline, an interfacial tension of 0.15 mN/m, and a molecular weight of 1500×10$^4$ (15.0 million), and could increase the recovery by 9.2% after the water flooding. This was because the commonly used side-chain hydrophobic monomer rather than symmetric branched monomer was used in Comparative Example 1, so although the monomer had less impact on the molecular weight, resulting in the product had a higher viscosity and a higher molecular weight, however the product had a poor interface activity, finally resulting in the increase in the recovery was only less than 10%.

Comparative Example 2

25 g of acrylamide monomer, 3 g of 2-acrylamido-2-methylpropanesulfonic acid, 3.6 g of tert-butyl acrylamide, 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane] dihydrochloride, and 0.00005 g of 4,4'-azodi(4-cyanovaleric acid) were dissolved in 2 g of deionized water respectively, and then successively added to reactor. The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Comparative Example 2 was dissolved in a 30000 mg/L saline solution under stirring, and a product solution with a concentration of 2000 mg/L was prepared. The solution viscosity was measured at 85° C. by using the coaxial cylinder mode of a Haake rheometer. The cutting rate is 7.34 s$^{-1}$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1.

It can be seen that the sample obtained in Comparative Example 2 had a viscosity of 6.5 mPa·s in 30000 mg/L saline, an immeasurable interfacial tension, and a molecular weight of 1500×10$^4$ (15.0 million), and could increase the recovery by 8.1% after the water flooding. This was due to the common anionic polyacrylamide in Comparative Example 2. Due to the lack of hydrophobic association structure, the solution viscosity in the saline with high salinity was only 6.5 mPa·s, and because of the presence of the monomer without interface activity in the product, the interfacial tension between the aqueous solution of the product and the crude oil was relatively high, and no data could be measured. Therefore, in the displacement experiment, there was only an effect of expanding the swept volume without an obvious effect of reducing the interfacial tension, resulting in a very low recovery.

Comparative Example 3

25 g of acrylamide monomer, 1.25 g of the branched monomer represented by formula (7) (wherein $R_1$ is a straight chain alkyl having 12 carbon atoms, $R_2$ and $R_3$ are both hydrogen atom, a is 6, b is 1), 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane] dihydrochloride, and 0.00005 g of 4,4'-azodi(4-cyanovaleric acid) were dissolved in 2 g of deionized water respectively, and then successively added to reactor. The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Comparative Example 3 was dissolved in a 30000 mg/L saline solution under stirring, and a product solution with a concentration of 3000 mg/L was prepared. The solution viscosity was measured at 85° C. by using the coaxial cylinder mode of a Haake rheometer. The cutting rate is 7.34 s$^{-1}$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1.

It can be seen that the sample obtained in comparative example 3 had a viscosity of only 7.5 mPa·s in 30000 mg/L saline, an interfacial tension of 0.057 mN/m, and a molecular weight of $1450 \times 10^4$ (14.5 million), and could increase the recovery by 9.3% after the water flooding. Due to the lack of introducing temperature-resistant and salt-resistant ionic monomers and non-ionic monomers, the tackifying ability of the product itself had significantly decreased compared with those of the examples. At the same time, the lack of ionic monomers also caused the reduced overall hydrophilicity of the molecule and the lack of the interface activity, therefore resulting in the reduced recovery compared with those of the products of examples.

Comparative Example 4

25 g of acrylamide monomer, 3 g of 2-acrylamido-2-methylpropanesulfonic acid, 3.6 g of tert-butyl acrylamide, 0.5 g of methacryloxyethyltrimethylammonium chloride, 1.25 g of hexadecyl acrylate, 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane] dihydrochloride, and 0.00005 g of 4,4'-azodi(4-cyanovaleric acid) were dissolved in 2 g of deionized water respectively, and then successively added to reactor. The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Comparative Example 4 was dissolved in a 30000 mg/L saline solution under stirring, and a product solution with a concentration of 2000 mg/L was prepared. The solution viscosity was measured at 85° C. by using the coaxial cylinder mode of a Haake rheometer. The cutting rate is 7.34 s$^{-1}$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1.

It can be seen that the sample obtained in Comparative Example 4 had a viscosity of 17 mPa·s in 30000 mg/L saline, an interfacial tension of 0.87 mN/m, and a molecular weight of $1250 \times 10^4$ (12.5 million), and could increase the recovery by 8.3% after the water flooding. Mainly due to using an ordinary acrylate derivative as the interface-active monomer, the reactivity ratio was relatively poor, the molecular weight was relatively low, and the interface activity of the product was insufficient, resulting in the relative poor viscosity and the relative poor interfacial tension, and the relatively low recovery.

Comparative Example 5

25 g of acrylamide monomer, 3.6 g of tert-butyl acrylamide, 0.5 g of methacryloxyethyltrimethylammonium chloride, 1.25 g of the branched monomer represented by formula (7) (wherein $R_1$ is a straight chain alkyl having 12 carbon atoms, $R_2$ and $R_3$ are both hydrogen atom, a is 6, b is 1), 0.02 g of ethylenediaminetetraacetic acid disodium salt, 0.2 g of urea, and 0.001 g of an organic silicon aqueous defoamer were dissolved in 100 g of water to prepare a mixed aqueous solution. The solution was adjusted to a pH value of 7.0 and a temperature of 10° C. Then the solution was placed in an adiabatic reactor. Nitrogen gas was passed into the reactor to remove oxygen gas while stirring, and the passing of nitrogen gas to remove oxygen gas was continued for 30 minutes. 0.00015 g of potassium bromate, 0.00012 g of sodium pyrosulfite, 0.00015 g of tert-butyl hydroperoxide, 0.00012 g of ferrous ammonium sulfate, 0.00005 g of azodiisobutylamidine hydrochloride, 0.00005 g of 2,2'-azo[2-(2-imidazolin-2-yl)propane]dihydrochloride, and 0.00005 g of 4,4'-azodi(4-cyanovaleric acid) were dissolved in 2 g of deionized water respectively, and then successively added to reactor. The passing of nitrogen gas was continued while stirring. After the viscosity of the polymerization reaction system increased obviously, i.e. the polymerization reaction started, the passing of nitrogen gas was stopped. After the temperature of the reaction system rose to the highest temperature, the system was maintained at the constant temperature for 2 hours. The polymerization product was taken out and cut into pellets. The pellets was dried in an oven at 90° C. until the solid content was greater than 89%, and then pulverized for later use.

The sample obtained in Comparative Example 5 was dissolved in a 30000 mg/L saline solution under stirring, and a product solution with a concentration of 2000 mg/L was prepared. The solution viscosity was measured at 85° C. by using the coaxial cylinder mode of a Haake rheometer. The cutting rate is 7.34 s$^{-1}$. A TX500c interfacial tensiometer was used to measure the interfacial tension between the above-mentioned solution and the crude oil. The molecular weight of the product was measured with an Ubbelohde viscometer. The oil displacement experiment was carried out in a sand-filled tube with a permeability rate of 1500 mD. The temperature was 85° C., the injection rate was 0.5 mL/min, and the crude oil viscosity was 1.25 mPa·s. The product solution was injected after the water flooding accomplished the water content of 98% or higher, and the enhanced percentage of the oil recovery caused by the product solution was measured. The experimental results were shown in Table 1.

It can be seen that the sample obtained in Comparative Example 5 had a viscosity of 7.8 mPa·s in 30000 mg/L saline, an interfacial tension of 0.047 mN/m, and a molecular weight of 1350×10⁴ (13.5 million), and could increase the recovery by 7.3% after the water flooding. Mainly due to lack of temperature-resistant and salt-resistant anionic monomers, the viscosity of the product in saline decreased, and meanwhile the hydrophilicity of the overall molecule became worse, the interface activity decreased, and after the overall charge on the molecular chain became cationic, its absorption in the displacement was enhanced, so the recovery was reduced.

TABLE 1

The properties of the products obtained in Examples and Comparative Examples

| No. | Viscosity mPa·s | Interfacial tension mN/m | Molecular weight ×10⁴ | Recovery % |
|---|---|---|---|---|
| Example 1 | 13 | 0.027 | 1350 | 12.3 |
| Example 2 | 10.5 | 0.033 | 1180 | 11.7 |
| Example 3 | 11 | 0.021 | 1200 | 12.7 |
| Example 4 | 9.8 | 0.019 | 1050 | 10.8 |
| Example 5 | 8.8 | 0.017 | 900 | 10.1 |
| Example 6 | 9.2 | 0.020 | 920 | 10.4 |
| Comparative Example 1 | 23 | 0.15 | 1500 | 9.2 |
| Comparative Example 2 | 6.5 | — | 1500 | 8.1 |
| Comparative Example 3 | 7.5 | 0.057 | 1450 | 9.3 |
| Comparative Example 4 | 9.1 | 0.87 | 650 | 6.3 |
| Comparative Example 5 | 7.8 | 0.047 | 1350 | 7.3 |

The invention claimed is:

1. A polyacrylamide-based symmetric branched polymer surfactant, comprising an acrylamide structure unit, an anionic monomer structure unit, an optional non-ionic monomer structure unit, a branched structure unit, and an optional cationic monomer structure unit, wherein the branched structure unit has at least one of structures of formula (1) and formula (2):

(1)

(2)

wherein, $R_1$ is $C_1$-$C_{28}$ hydrocarbyl; $R_2$ is selected from hydrogen atom, amino, carboxylic acid group, sulfonic acid group, sulfuric acid group, phosphoric acid group, mercapto, and halogen; $R_3$ is hydrogen or methyl; $R_4$ is —O—, —CH₂—, —CH₂OCH₂— or —CH₂O—; n is the number of Poly, Poly is independently at least one of a and b are each independently 0-40, and a and b are not 0 at the same time.

2. The polyacrylamide-based symmetric branched polymer surfactant according to claim 1, wherein
$R_1$ is $C_5$-$C_{20}$ hydrocarbyl; $R_2$ is hydrogen, amino, carboxylic acid group, or sulfonic acid group; and a is 5-24, b is 0-5.

3. The polyacrylamide-based symmetric branched polymer surfactant according to claim 1, wherein the polymer surfactant is obtained by polymerization in a reaction mixture comprising, in parts by weight: 5-25 parts of acrylamide, 2-20 parts of anionic monomer, 0-25 parts of cationic monomer, 1-10 parts of non-ionic monomer, and 1-20 parts of symmetric branched monomer.

4. The polyacrylamide-based symmetric branched polymer surfactant according to claim 3,
wherein the anionic monomer is at least one selected from acrylic acid, methacrylic acid, sodium vinylsulfonate, p-vinylbenzenesulfonic acid, maleic acid, fumaric acid, vinylbenzenesulfonic acid, allylsulfonic acid, allylbenzenesulfonic acid, 2-acrylamido-2-methylpropanesulfonic acid, and alkali metal salts or ammonium salts thereof; and/or, the cationic monomer is selected from at least one of methacryloxyethyltrimethylammonium chloride, 2-acrylamido-2-methylpropyltrimethylammonium chloride, dimethylethylallylammonium chloride, dimethyldiallylammonium chloride, acryloxyethyltrimethylammonium chloride, acryloxyethyldimethylbenzylammonium chloride, and methacryloxyethyldimethylbenzylammonium chloride; and/or, the non-ionic monomer is selected from at least one of methacrylamide, dimethylacrylamide, diethylacrylamide, hydroxymethylacrylamide, hydroxyethylacrylamide, dimethylaminopropylmethacrylamide, hydroxyethyl methacrylate, hydroxyethyl methacrylate, dimethylaminoethyl methacrylate, vinyl pyrrolidone, tert-butyl acrylamide.

5. The polyacrylamide-based symmetric branched polymer surfactant according to claim 3, wherein
the symmetric branched monomer is at least one selected from monomers of formula (3) to monomers of formula (12):

(3)

(4)

(5)

-continued

(6)

(7)

(8)

(9)

(10)

(11)

(12)

wherein, $R_1$ is $C_1$-$C_{28}$ hydrocarbyl; $R_2$ is hydrogen, amino, carboxylic acid group, sulfonic acid group, sulfuric acid group, phosphoric acid group, mercapto, or halogen; $R_3$ is hydrogen or methyl; a and b are each independently 0-40, and a and b are not 0 at the same time.

6. The polyacrylamide-based symmetric branched polymer surfactant according to claim 1, wherein the reaction mixture further comprises one or more of,
in parts by weight, 0.0001-0.005 parts of an oxidizing agent, 0.0001-0.005 parts of a reducing agent, 0.0001-0.005 parts of an azo initiator, 5-150 parts of water, 0.001-0.01 parts of a defoamer, 0.001-0.5 parts of a chelating agent, 0.001-0.5 parts of a cosolvent.

7. The polyacrylamide-based symmetric branched polymer surfactant according to claim 6, wherein
the oxidizing agent is selected from at least one of potassium persulfate, sodium persulfate, hydrogen peroxide, benzoyl peroxide, potassium bromate, tert-butyl hydroperoxide, lauroyl peroxide, cumene hydroperoxide, di-tert-butyl peroxide, dicumyl peroxide, t-butyl peroxybenzoate, tert-butyl peroxypivalate, methylethyl ketone peroxide, cyclohexanone peroxide, diisopropyl peroxydicarbonate, and dicyclohexyl peroxydicarbonate; and/or,
the reducing agent is selected from at least one of sodium bisulfite, sodium thiosulfate, sodium dithionite, sodium pyrosulfite, tetramethyl ethylene diamine, ferrous ammonium sulfate, sodium formaldehyde sulfoxylate, N,N-dimethylaniline, tartaric acid, ferrous sulfate, N,N-diethylaniline, ferrous pyrophosphate, silver nitrate, mercaptan, ferrous chloride, tetraethyleneimine, glycerol, and pentaerythritol; and/or,
said azo initiator is selected from at least one of azodiisobutyronitrile, azodiisovaleronitrile, azodiisoheptylonitrile, dimethyl azodiisobutyrate, azodiisobutylamidine hydrochloride, 2,2'-azo [2-(2-imidazolin-2-yl) propane] dihydrochloride, azodi (2,5-dimethyl-6-carboxyl) capronitrile, and 4,4'-azodi (4-cyanovaleric acid); and/or,
said cosolvent is selected from at least one of urea, ammonia water, sodium formate, and sodium acetate; and/or,
the defoamer is an organic silicon aqueous defoamer; and/or,
the chelating agent is selected from at least one of ethylenediamine tetraacetic acid, ethylenediaminetetraacetic acid disodium salt, and ethylenediaminetetraacetic acid tetrasodium salt.

8. The polyacrylamide-based symmetric branched polymer surfactant according to claim 1, which has at least 1, at least 2, at least 3, at least 4, at least 5, at least 6, at least 7 or all of the following properties:
(1) Solution viscosity: 8-15mPa·s;
(2) Interfacial tension: 0.010-0.040 mN/m;
(3) Viscosity-average molecular weight: 750-1500×$10^4$, preferably 900-1350×$10^4$;
(4) Density: 1.1-1.5 g/$cm^3$, preferably 1.2-1.3 g/$cm^3$;
(5) Filtration ratio: ≤1.5;
(6) Solid content: ≥89%;
(7) Dissolution time: ≤2 hours; and
(8) Insoluble content: ≤0.2%.

9. The polyacrylamide-based symmetric branched polymer surfactant according to claim 1, wherein, in the proton nuclear magnetic resonance spectrum (400 MHz, deuterated methanol as solvent) of the surfactant, the characteristic peak(s) appear at one, two, three, four, five or six among the following chemical shifts: δ 1.21±0.1 ppm, δ 1.73±0.1 ppm, δ 2.12±0.1 ppm, δ 3.34±0.1 ppm, delta 3.60±0.1 ppm, and delta 3.80±0.1 ppm.

10. A process for preparing the polyacrylamide-based symmetric branched polymer surfactant according to claim 1, wherein reactants comprising acrylamide, the anionic monomer, the optional non-ionic monomer, the symmetric branched monomer, and the optional cationic monomer are subjected to aqueous solution polymerization.

11. The preparation process according to claim 10, comprising:
1) dissolving a part of the reactants in water to form a solution;

2) adjusting the pH value of the solution to 6-12, and adjusting the temperature of the solution to 0-25° C.; and 3) under an inert atmosphere and under an adiabatic condition, adding a remainder of the reactants to carry out the polymerization reaction, and after the temperature of the reaction mixture rises to a preset temperature, maintaining the temperature constant for 1-8 hours to obtain the polymer surfactant.

12. An oil displacement agent comprising the polyacrylamide-based symmetric branched polymer surfactant according to claim 1.

* * * * *